Patented Feb. 17, 1925.

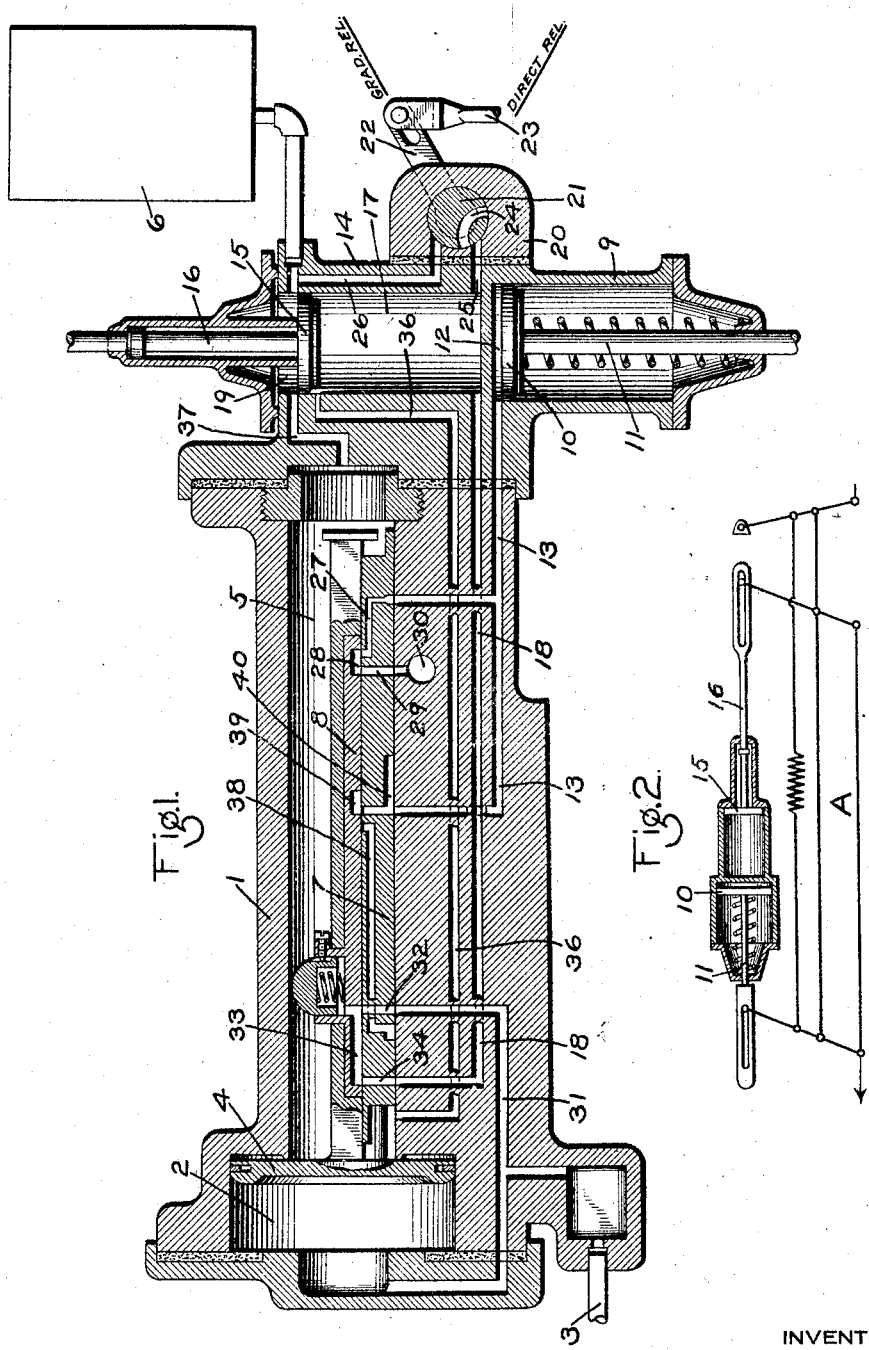

1,526,777

UNITED STATES PATENT OFFICE.

WILLIAM E. DEAN, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 28, 1923, Serial No. 648,274. Renewed July 24, 1924.

*To all whom it may concern:*

Be it known that I, WILLIAM E. DEAN, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a triple valve device having means for effecting a graduated release of the brakes.

The principal object of my invention is to provide means for cutting out the graduated release feature of a certain type of graduated release triple valve device.

In the accompanying drawing; Fig. 1 is a sectional view of a triple valve device with my improvement applied thereto; and Fig. 2 a diagram showing how the triple valve device is associated with the brake rigging of the car.

As shown in the drawing, the triple valve device may comprise a casing 1 having a piston chamber 2 connected to the usual brake pipe 3 and containing piston 4 and having a valve chamber 5 connected to a reservoir 6 and containing a main slide valve 7 and a graduating slide valve 8, adapted to be operated by said piston.

Associated with the casing 1 is a brake cylinder 9 containing a brake cylinder piston 10 having a piston rod 11, the piston chamber 12 having a passage 13 leading to the seat of slide valve 7 and also associated with casing 1 is a cylinder 14 containing a piston 15 having a piston stem 16. The chamber 17 at one side of piston 15 has a passage 18 leading to the seat of slide valve 7 and chamber 19 at the opposite side of said piston is connected to reservoir 6, so that valve chamber 5, piston chamber 19, and reservoir 6 form one volume.

Associated with cylinders 9 and 14 is a casing 20 containing a cock 21 adapted to be manually operated by means of a lever 22 and an operating rod 23. The cock 21 is provided with two operating positions and in one position, a cavity 24 connects a passage 25 leading to chamber 17 with a passage 26 leading to piston chamber 19, so that direct release may be provided in this position and in the other position, communication between the chamber 17 and chamber 19 is cut off so as to permit the triple valve device to operate as a graduated release triple. As shown in Fig. 2, the piston rods 11 and 16 are connected to the brake rigging A of the car, so that when the piston 10 is moved outwardly the brakes will be applied.

In operation, fluid supplied to the brake pipe 3 flows to piston chamber 2 and shifts piston 4 to release position, as shown in Fig. 1. In this position, the brake cylinder piston chamber 12 is connected to the exhaust through passage 13, restricted port 27 in main slide valve 7, cavity 28 in slide valve 8, port 29 in slide valve 7 and exhaust port 30. The chamber 17 is charged with fluid from the brake pipe 3 through passage 31, port 32 in slide valve 7, cavity 33 in slide valve 8, port 34 in slide valve 7 and passage 18. The piston 15 is moved upwardly by the pressure of fluid supplied to chamber 17 to the position shown in Fig. 1, the movement being assisted by the fact that the area of piston rod 16 is subject to atmospheric pressure. In this position, communication is established from chamber 17 to passage 36. Fluid then flows through passage 36 to valve chamber 5, and thence through passage 37 to piston chamber 19 and the reservoir 6.

With the cock 21 in graduated release position, as shown in Fig. 1, when the brake pipe pressure is reduced to effect a service application of the brakes, the higher pressure in valve chamber 5 shifts piston 4 to its extreme left hand position. The initial movement of the piston 4 operates slide valve 8 without moving slide valve 7 so as to close the exhaust communication from the brake cylinder and also cut off communication from the brake pipe to the chamber 17. Upon movement of the main slide valve 7 to service application position, fluid is supplied from chamber 17 to the brake cylinder, through passage 18, port 38 in slide valve 7, cavity 39 in graduating slide valve 8, port 40 in slide valve 7, and passage 13.

The brake cylinder piston 10 is then moved outwardly to effect an application of the brakes in the usual manner and as the pressure in chamber 17 is reduced by flow to the brake cylinder, the piston 15 is moved downwardly by the higher pressure in chamber 19. The downward movement of piston 15 enlarges the volume of chamber 19 and this chamber being open to valve chamber 5 and reservoir 6, the pressure in the combined volume is reduced in proportion to the increase in volume. When the pressure in valve chamber 5 has been reduced to a point slightly less than the reduced brake pipe pressure acting in piston chamber 2, the piston 4 will be shifted to the right to service lap position, in which the graduating slide valve 8 has been moved so as to cut off communication through which fluid is supplied from the chamber 17 to the brake cylinder chamber 12.

If it is desired to effect a graduated release of the brakes, the brake pipe pressure is increased to a point slightly exceeding the pressure in valve chamber 5. Piston 4 is then moved by the higher brake pipe pressure to release position, in which fluid is released from brake cylinder chamber 12 to the exhaust port 30 through the restricted port 27. At the same time, fluid is supplied from the brake pipe to chamber 17 through passage 31, port 32, cavity 33, port 34, and passage 18 and when the pressure in chamber 17 has been increased to a point exceeding the pressure in chamber 19, taking into account the fact that the differential area of piston rod 16 is exposed to atmospheric pressure, the piston 15 will be moved upwardly. The upward movement of piston 15 will reduce the volume of chamber 19 and will thus increase the pressure in valve chamber 5 and reservoir 6 and when the pressure in valve chamber 5 has been increased to a point slightly exceeding the pressure in the brake pipe and in piston chamber 2, the piston 4 will be moved from release position to release lap position, in which communication from the brake cylinder to the exhaust is cut off and in which communication from the brake pipe to chamber 17 is closed.

It will be evident that the brake cylinder pressure may be further reduced by making a further slight increase in brake pipe pressure, when the above described operation will be repeated.

In order to ensure the desired operation in effecting graduated release as above described, it is necessary to restrict the discharge of fluid from the brake cylinder, as at the restricted port 27, in order to provide a sufficient time interval for the pressure in chamber 17 to be increased by flow from the brake pipe before the brake cylinder pressure is reduced too much, since it is necessary that piston 15 be moved upwardly by the increase in pressure in chamber 17 in order that the pressure in valve chamber 5 may be increased to effect the movement of the triple valve parts to the graduated release lap position.

In some instances, graduated release may not be necessary, as where a train is operating on long level stretches of road and in such cases it may be desirable to suppress the graduated release feature in order to prevent delays caused by undesired graduated release action. Such undesired graduated release may be produced even when a direct release is intended, due to the sensitive character of the triple valve device, and its inherent tendency to move from release to graduated release lap position, when the brake pipe pressure is increased to effect the release of the brakes.

According to my inventon, by turning the cock 21 to its direct release position, the chamber 17 is connected to chamber 19 through passage 25, cavity 24, and passage 26, so that the valve chamber 5, the reservoir 6, and chamber 17 being directly connected together, the total volume acts as an auxiliary reservoir and is not influenced by the piston 15 and it will be evident that the triple valve device will now operate as an ordinary triple valve device to supply fluid from the auxiliary reservoir volume to the brake cylinder upon a reduction in brake pipe pressure and to open communication for releasing fluid from the brake cylinder, when the brake pipe pressure is increased.

Having now described my invention, what I claim as new and desire to secure by Letters Patent, is:

1. In a fluid pressure brake, the combination with a brake pipe, brake cylinder, a reservoir, a chamber, a valve device subject to the opposing pressures of the brake pipe and said reservoir and operated upon a reduction in brake pipe pressure for supplying fluid from said chamber to the brake cylinder, and a piston movable according to the opposing pressures of said reservoir and said chamber, of a valve having a position in which communication is established between said chamber and said reservoir.

2. In a fluid pressure brake, the combination with a brake pipe, brake cylinder, a reservoir, a chamber, a valve device subject to the opposing pressures of the brake pipe and said reservoir and operated upon a reduction in brake pipe pressure for supplying fluid from said chamber to the brake cylinder, and a piston movable according to the opposing pressures of said reservoir and said chamber, of a valve having a position in which communication is established between said chamber and said reservoir and another position in which communication between said chamber and said reservoir is cut off.

3. In a fluid pressure brake, the combination with a brake pipe, brake cylinder, a reservoir, a chamber, a piston subject to the opposing pressures of the reservoir and the brake pipe, valve means operated by said piston upon a reduction in brake pipe pressure for supplying fluid from said chamber to the brake cylinder and upon an increase in brake pipe pressure for releasing fluid from the brake cylinder, and a movable abutment separating said chamber from said reservoir, of a manually operable valve having a position for establishing communication from said chamber to said reservoir.

In testimony whereof I have hereunto set my hand.

WILLIAM E. DEAN.